(12) United States Patent
Curran et al.

(10) Patent No.: US 11,214,886 B2
(45) Date of Patent: Jan. 4, 2022

(54) ZINC-BASED SEAL FOR ANODIZED PARTS

(71) Applicant: Apple Inc., Cupertino, CA (US)

(72) Inventors: James A. Curran, Morgan Hill, CA (US); Rohit G. Puranik, Rochester, NY (US); Shi Hua Zhang, Wilmington, DE (US); James A. Dean, Palo Alto, CA (US); Karin H. Rasmussen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 140 days.

(21) Appl. No.: 16/360,851

(22) Filed: Mar. 21, 2019

(65) Prior Publication Data

US 2019/0382911 A1     Dec. 19, 2019

Related U.S. Application Data

(60) Provisional application No. 62/685,816, filed on Jun. 15, 2018.

(51) Int. Cl.
| | |
|---|---|
| *C25D 11/24* | (2006.01) |
| *C25D 11/34* | (2006.01) |
| *C25D 11/14* | (2006.01) |
| *B32B 15/01* | (2006.01) |

(52) U.S. Cl.
CPC .......... *C25D 11/246* (2013.01); *B32B 15/017* (2013.01); *C25D 11/14* (2013.01); *C25D 11/34* (2013.01); *Y10T 428/2462* (2015.01); *Y10T 428/31678* (2015.04)

(58) Field of Classification Search
CPC ......... C25D 11/04; C25D 11/14; C25D 11/18; C25D 11/22; C25D 11/243; C25D 11/246; C25D 11/34; B32B 15/017; Y10T 428/2462; Y10T 428/31678; C22C 21/18; C23F 11/185; C23F 13/00; H05K 5/04; H05K 5/0243
See application file for complete search history.

(56) References Cited

U.S. PATENT DOCUMENTS

| | | | |
|---|---|---|---|
| 3,016,293 A | 1/1962 | Alexander et al. | |
| 7,122,107 B2 | 10/2006 | Kia et al. | |
| 7,931,939 B2 | 4/2011 | Yamaguchi | |
| 2011/0284383 A1* | 11/2011 | Cabot | C23C 28/04 205/50 |

(Continued)

FOREIGN PATENT DOCUMENTS

| | | |
|---|---|---|
| CN | 101812713 A | 8/2010 |
| WO | 2018145780 A1 | 8/2018 |

OTHER PUBLICATIONS

Abdel-Salam et al., "Characterization of the hard anodizing layers formed on 2014-T3 Al alloy, in sulphuric acid electrolyte containing sodium lignin sulphonate," Egyptian Journal of Petroleum, Aug. 9, 2017 <https://doi.org/10.1016/j.ejpe.2017.07.014>, 8 pages.

*Primary Examiner* — Catherine A. Simone
(74) *Attorney, Agent, or Firm* — Dorsey & Whitney LLP

(57) ABSTRACT

This application relates to an enclosure for a portable electronic device. The enclosure includes an aluminum alloy substrate and an anodized layer overlaying and formed from the aluminum alloy substrate, wherein the anodized layer has an external surface that has a concentration of zinc that is between about 3 wt % to about 7 wt %.

20 Claims, 14 Drawing Sheets

(56) References Cited

U.S. PATENT DOCUMENTS

| | | | |
|---|---|---|---|
| 2012/0103819 A1* | 5/2012 | Chang | C25D 11/18 |
| | | | 205/50 |
| 2015/0096893 A1* | 4/2015 | Jeong | B22D 21/007 |
| | | | 205/50 |
| 2016/0089834 A1 | 3/2016 | Mag et al. | |
| 2016/0362808 A1 | 12/2016 | Yamamoto et al. | |
| 2017/0016136 A1 | 1/2017 | Yamamoto et al. | |
| 2017/0107628 A1 | 4/2017 | Trinidad et al. | |
| 2017/0356097 A1 | 12/2017 | Eagerton | |
| 2018/0023210 A1 | 1/2018 | Akimoto et al. | |
| 2018/0080138 A1 | 3/2018 | Curran et al. | |
| 2019/0032237 A1 | 1/2019 | Kim et al. | |

* cited by examiner

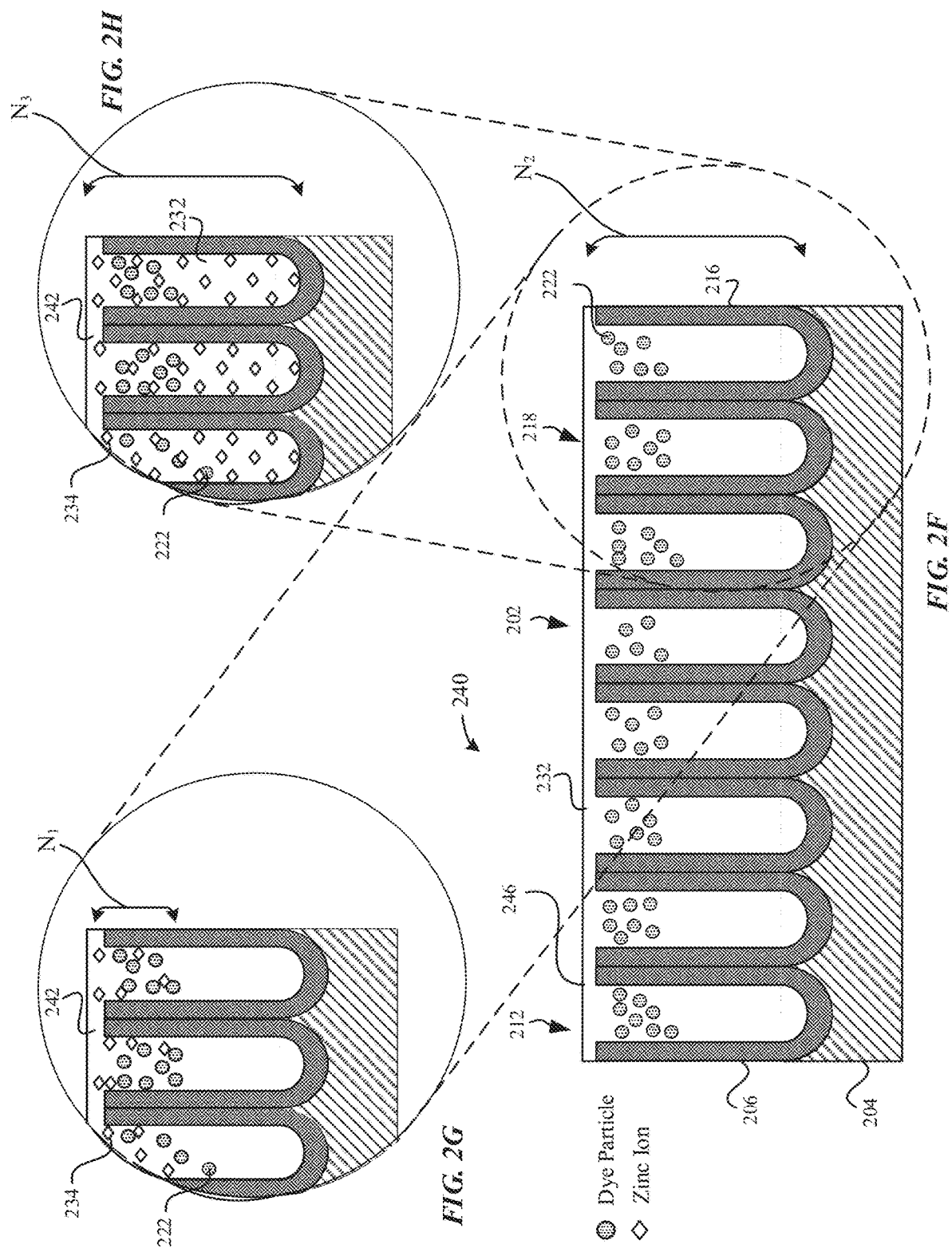

ZINC-BASED SEAL FOR ANODIZED PARTS

CROSS-REFERENCE TO RELATED APPLICATIONS

The present application claims the benefit of U.S. Provisional Application No. 62/685,816, entitled "ZINC-BASED SEAL FOR ANODIZED PARTS," filed Jun. 15, 2018, which is incorporated by reference herein in its entirety for all purposes.

FIELD

The described embodiments relate generally to alternatives to nickel-based sealants for sealing anodized parts that are used in consumer portable electronic devices. More particularly, the described embodiments relate to the use of zinc-based sealants to seal these anodized parts.

BACKGROUND

Enclosures for portable electronic devices can include an anodized layer that may be dyed in different colors using dye particles so as to impart these enclosures with an aesthetically pleasing appearance. In particular, the anodized layer is sealed so as to lock these dye particles within the anodized layer. Moreover, sealing the anodized layer can protect the cosmetic oxide surface from staining by external contamination, and can protect the underlying metal substrate from environmental contaminants that may otherwise cause corrosion. Nickel-based sealants are particularly effective and are widely used. However, nickel-based chemistries are generally undesirable due to their toxicity. Moreover, an enclosure having an anodized layer with a nickel-based seal may cause allergic reactions among its users. Therefore, there is a need to implement non-toxic sealing alternatives that provide at least an equivalent amount of corrosion protection, stain resistance, and color lock as conventional sealing solutions.

SUMMARY

The described embodiments relate generally to alternatives to nickel-based sealants for sealing anodized parts that are used in consumer portable electronic devices. More particularly, the described embodiments relate to the use of zinc-based sealants to seal these anodized parts.

According to some embodiments, an enclosure for a portable electronic device is described. The enclosure includes an aluminum alloy substrate and an anodized layer overlaying and formed from the aluminum alloy substrate, wherein the anodized layer has an external surface that has a concentration of zinc that is between about 3 wt % to about 7 wt %.

According to some embodiments, an enclosure for a portable electronic device is described. The enclosure includes a metal substrate and a metal oxide layer that overlays the metal substrate. The metal oxide layer includes pores that extend between openings at an external surface of the metal oxide layer and terminate near the metal substrate, and a zinc-based sealant that fills the pores of the metal oxide layer, where an external concentration of zinc at the external surface of the metal oxide layer is greater than an internal concentration of zinc at an inner region of the metal oxide layer.

According to some embodiments, a method for forming an enclosure for a portable electronic device, the enclosure including a metal substrate that is overlaid by a metal oxide layer, is described. The method includes sealing pore structures of the metal oxide layer by exposing the metal oxide layer to a zinc-based sealing solution such that a concentration of zinc at an external surface of the metal oxide layer is between about 3 wt % to about 7 wt %.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIGS. 2A-2H illustrate cross-sectional views of a process for sealing pores of a metal oxide layer, in accordance with some embodiments.

DETAILED DESCRIPTION

Figure 1:
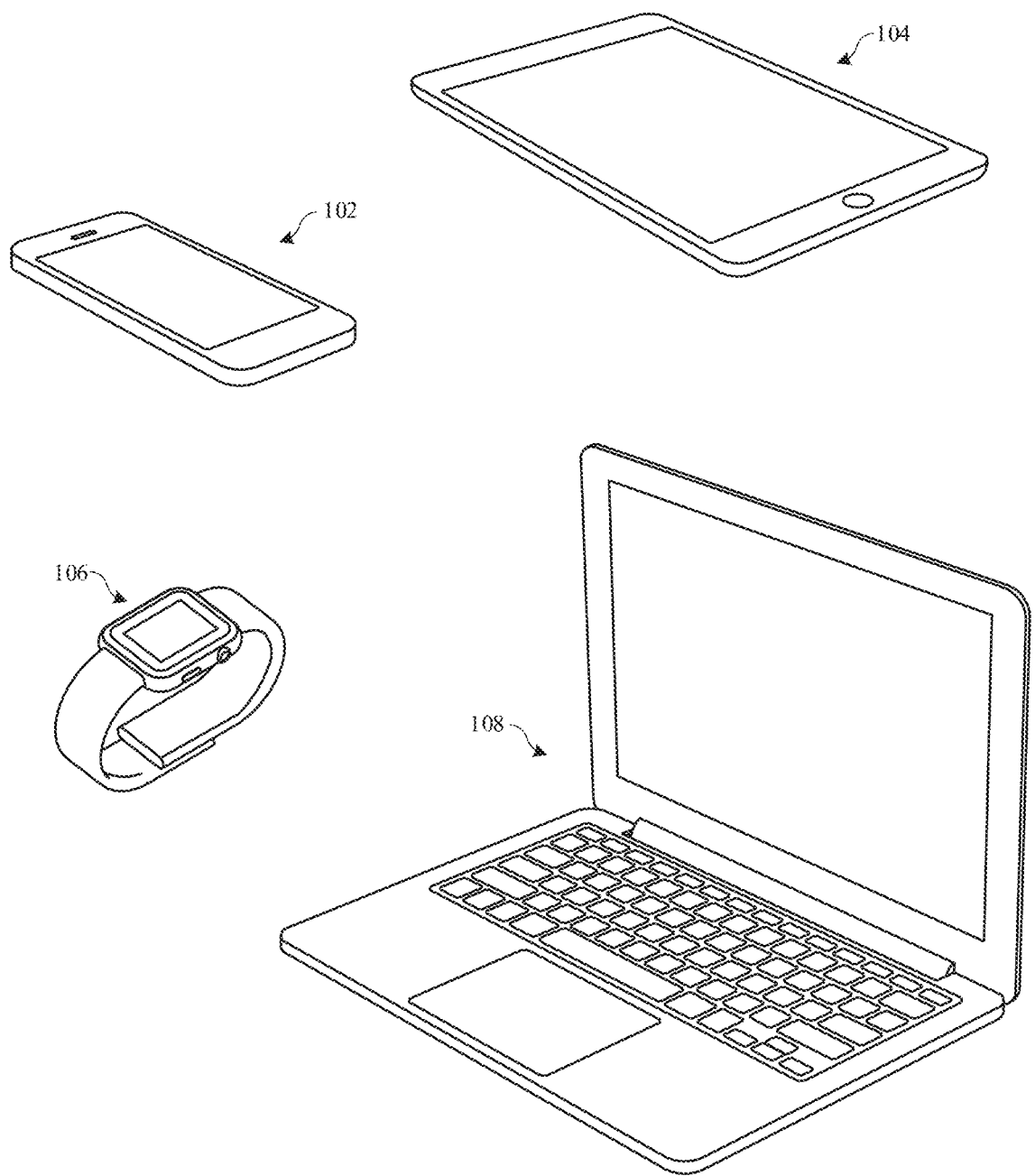
FIG. 1 illustrates perspective views of various portable electronic devices having enclosures that may be processed using the techniques described herein, in accordance with some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The embodiments described herein set forth alternative techniques for sealing anodized parts. In particular, the techniques described herein set forth using zinc-based seals as an alternative to nickel-based seals. While nickel-based seals provide adequate control of dyed cosmetic anodizing, these nickel-based seals are generally undesirable due to the toxicity of nickel salts. In contrast, zinc is shown to be a suitable non-toxic replacement for nickel that matches or exceeds the performance of nickel-based seals.

Anodized metals have highly porous, optically transparent oxides that may be dyed to a precise color, and subsequently sealed to fix the color. The capability to be dyed makes anodized metals highly desirable in the consumer electronics device industry. Indeed, these anodized metals may be dyed a wide range of colors. Colors can be tuned by adjusting the composition of the dye bath (concentration of colorants, and pH), and by adjusting the time and temperature of the dye bath. By maintaining a constant bath composition, pH and temperature, time may be used to precisely fine-tune color to within DE94 of <1 of any given color target during production. However, zinc-based seals are generally undesirable due to the toxicity of the nickel salts. Indeed, stricter environmental regulations on dyeing anodized parts discourages the use of toxic salts. Moreover, nickel salts present in dyed anodized parts are also known to cause dermatitis (i.e., allergic skin reactions) in users.

Anodized enclosures that are dyed and subsequently sealed are tested for seal quality. For example, the anodized enclosures are tested for protection against absorption of dirt and stains into the pore structures. One test involves a "dye spot test" wherein the inability of a sealed anodized surface to absorb dye is measured. In particular, a spot is made on the anodized surface using an indelible marker, and then an attempt is made to remove the spot with scrubbing and only water as a solvent. Only if there is no residual mark is the anodized surface considered to pass the threshold and to have adequate stain-resistance and seal quality.

Another test involves controlled exposure of the anodized surface to a wide range of chemicals to which the anodized surface might be reasonably expected to be exposed during its service life. Examples include substances such as sweat, sebum, oleic acid, sunscreen, hand-sanitizer, lipstick, ketchup, mustard, hot coffee, carbonated drinks, and various household and industrial cleaners and solvents. These chemicals are typically studied by controlled application to the surface, followed by a heat soak at 65° C. and 95% relative humidity for 72 hours, and then a light cleaning procedure before carful inspection of the surface for staining and any surface damage. Only minimal levels of discoloration will be tolerated.

Another test involves longer term environmental exposure, such as light exposure, heat exposure, ocean water exposure, alternating sweat immersion, and the like. Yet another test involves the quantitative measures of electrochemical impedance spectroscopy (EIS), a simplified variant of EIS performed at a fixed frequency (typically 1 kHz) called admittance testing, and acid dissolution testing (ADT).

Although it has been well established that nickel acetate is generally undesirable due to its toxicity, decades of research and development has yet to produce a non-toxic sealing alternative that can reliably pass these sealing tests, let alone match the performance of a nickel acetate-sealed surface. Indeed, there are no commercially available alternatives which meet the standards for reliability required in the consumer electronics device industry. Additionally, the alternative sealing solution will ideally need to be implemented as a single-step process, not requiring additional equipment, time or processing tanks. Moreover, the sealing alternative should also yield similar, tightly controlled color distributions across a wide range of dye colors.

The embodiments described herein set forth using zinc acetate as an effective substitute for nickel acetate in the hydrothermal sealing of dyed anodized aluminum. Unlike nickel acetate, zinc acetate is non-toxic: one of its major uses is as a dietary supplement. It is readily available and significantly less expensive than nickel acetate—especially when safe disposal of used chemistry is taken into account. Moreover, zinc acetate demonstrates an ability to stabilize colorants to at least the same degree as nickel acetate. Furthermore, zinc ions are of the same 2+ charge as nickel, and of similar or very slightly larger ionic radius to nickel. Moreover, zinc acetate sealed anodized aluminum exhibits at least equivalent performance to nickel acetate sealed anodized aluminum in the relevant long term exposure tests. Moreover, the color shift of dyed anodized parts using zinc acetate is very minimal—at least equivalent to nickel acetate. A repeatable, controllable de94 of <1 is observed from the post-dye stage to the final product, which is very important in the consumer electronic space where thousands of parts are dyed in a single dye bath, and uniformity of color dye is of critical importance to the aesthetics of these consumer enclosures. Additionally, zinc acetate included in the anodized layer demonstrates an impedance that is at least equivalent to nickel acetate, which indicates that a similar degree of physical plugging of the pores and electrochemical resistance has been established across the sealed anodized layers. Finally, zinc acetate is a very effective substitute for the consumer electronic device industry because the touch and feel of the sealed anodized surface is very similar to that achieved using nickel acetate sealing.

According to some embodiments, an enclosure for a portable electronic device is described. The enclosure includes an aluminum alloy substrate and an anodized layer overlaying and formed from the aluminum alloy substrate, wherein the anodized layer has an external surface that has a concentration of zinc that is between about 3 wt % to about 7 wt %.

As used herein, the terms anodic film, anodized film, anodic layer, anodized layer, anodic oxide coating, anodic layer, anodic oxidized layer, metal oxide layer, oxide film, oxidized layer, and oxide layer can be used interchangeably and refer to any appropriate oxide layers. The oxide layers are formed on metal surfaces of a metal substrate. The metal substrate can include any of a number of suitable metals or metal alloys. In some embodiments, the metal substrate can include aluminum, and the aluminum is capable of forming an aluminum oxide when oxidized. In some embodiments, the metal substrate can include an aluminum alloy. As used herein, the terms part, layer, segment, and section can also be used interchangeably where appropriate.

These and other embodiments are discussed below with reference to FIGS. 1, 2A-2G, 3-8, 9A-9B, and 10; however, those skilled in the art will readily appreciate that the detailed description given herein with respect to these figures is for explanatory purposes only and should not be construed as limiting.

FIG. 1 illustrates various portable electronic devices that can be processed using the techniques as described herein. The techniques as described herein can be used to process metallic surfaces (e.g., metal oxide layers, etc.) of enclosures of the portable electronic devices. In some examples, the techniques described herein may be used to color the metallic surfaces by causing dye particles to become absorbed within the metallic surfaces. In some examples, the techniques described herein may be used to seal pore structures of metal oxide layers such as to prevent external contaminants from reaching the underlying metal substrate. Additionally, sealing the pore structures also prevents the dye particles from leaching out of the metal oxide layer. FIG. 1 illustrates a smartphone 102, a tablet computer 104, a smartwatch 106, and a portable computer 108. These exemplary portable electronic devices may be capable of using personally identifiable information that is associated with one or more users. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

According to some embodiments, the metallic surfaces can refer to a metal oxide layer that overlays a metal substrate. In some examples, the metal oxide layer is formed from the metal substrate during an anodization/oxidation process. The metal oxide layer can function as a protective coating to protect the metal substrate, for example, when these portable electronic devices are dropped, scratched, chipped, abraded, or exposed to various corrosive contaminants.

In some examples, metal oxide layer includes pore structures (or pores) that are formed through a portion of the metal oxide layer. The pore structures extend from an external surface of the metal oxide layer and terminate at a bottom surface/terminus surface. The metal oxide layer may be separated from the underlying metal substrate by a non-porous barrier layer.

Additionally, each of the pore structures of the metal oxide layer are capable of receiving dye particles which can imbue the metal oxide layer with a specific color that corresponds to the dye particles. In particular, the metal oxide layer may be dyed prior to sealing the metal oxide layer. Dyeing the metal oxide layer enables the metallic surface to be imbued with a wider range of colors. In particular, the pore structures may have a diameter between about 20 nm to about 40 nm, which is large enough to receive the dye particles. Several parameters may influence and control uptake of dye particles into the pore structures which may include dye concentration, chemistry of the dye solution, pH of dye solution, temperature of dye solution, and dyeing time, as will be described in greater detail herein. Subsequent to dyeing the metallic surface, the pore structures are sealed so that the dye particles are permanently and physically retained within the pore structures. In some examples, the color of the metal oxide layer may be characterized according to CIE L*a*b* color-opponent dimension values. The L* color opponent dimension value is one variable in an L*a*b* color space. In general, L* corresponds to an amount of lightness. L*=0 represents the darkest black while L*=100 represents white In general, a* indicates amounts of red color and green color in a sample. A negative a* value indicates a green color, while a positive a* value indicates a red color. Accordingly, samples having a positive a* value will indicate that more red than green is present. In general, b* indicates amounts of blue color and yellow color in a sample. A negative b* value indicates a blue color, while a positive b* value indicates yellow color. Accordingly, samples having a positive b* value will indicate more yellow than blue is present.

FIGS. 2A-2G illustrate cross-sectional views of a process for sealing pores of a metal oxide layer, in accordance with some embodiments. In some embodiments, a metal part 200 that is being processed has a near net shape of a final part, such as the enclosures of the portable electronic devices 102, 104, 106, and 108.

Figure 2A:
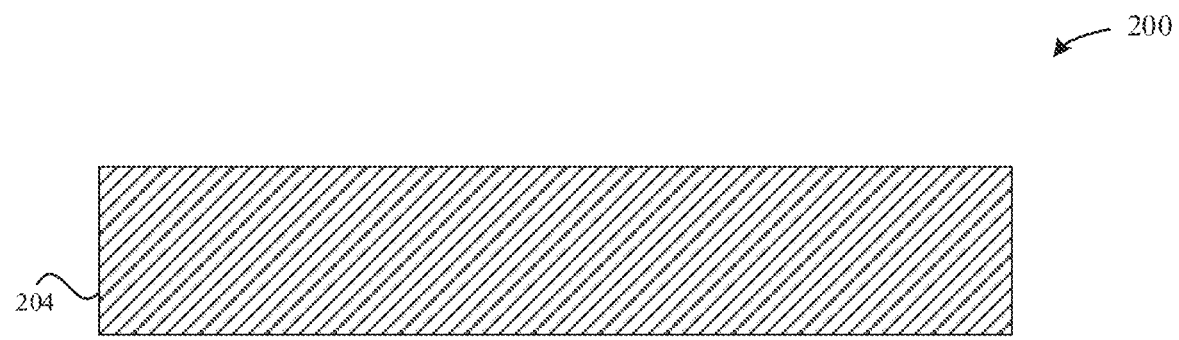

FIG. 2A illustrates the metal part 200 prior to undergoing an anodization process. In some examples, the metal part 200 may correspond to the metal substrate 204. The metal substrate 204 may have any thickness that is suitable for providing sufficient strength, hardness and rigidity to protect electronic component(s) that are carried within the portable electronic device and to protect brittle components (e.g., ceramic, glass, etc.) of the enclosure. The metal substrate 204 may be subject to one or more pre-anodization processes. In some examples, the pre-anodization processes of the metal substrate 204 include at least one of polishing, texturizing, buffering, cleaning, and the like. Beneficially, in this manner, surface(s) of the metal substrate 204 may assume any number of desired surface geometries and surface finishes. In some examples, the metal substrate 204 is a three-dimensional structure having a height, width, and depth, and the metal substrate 204 can have any type of geometry that is suitable for forming an overlaying metal oxide layer, as will be described in greater detail herein. In particular, the geometry of the metal substrate 204 is characterized as rectangular, polygonal, circular, beveled edges, angular edges, elliptical, etc.

Figure 2B:
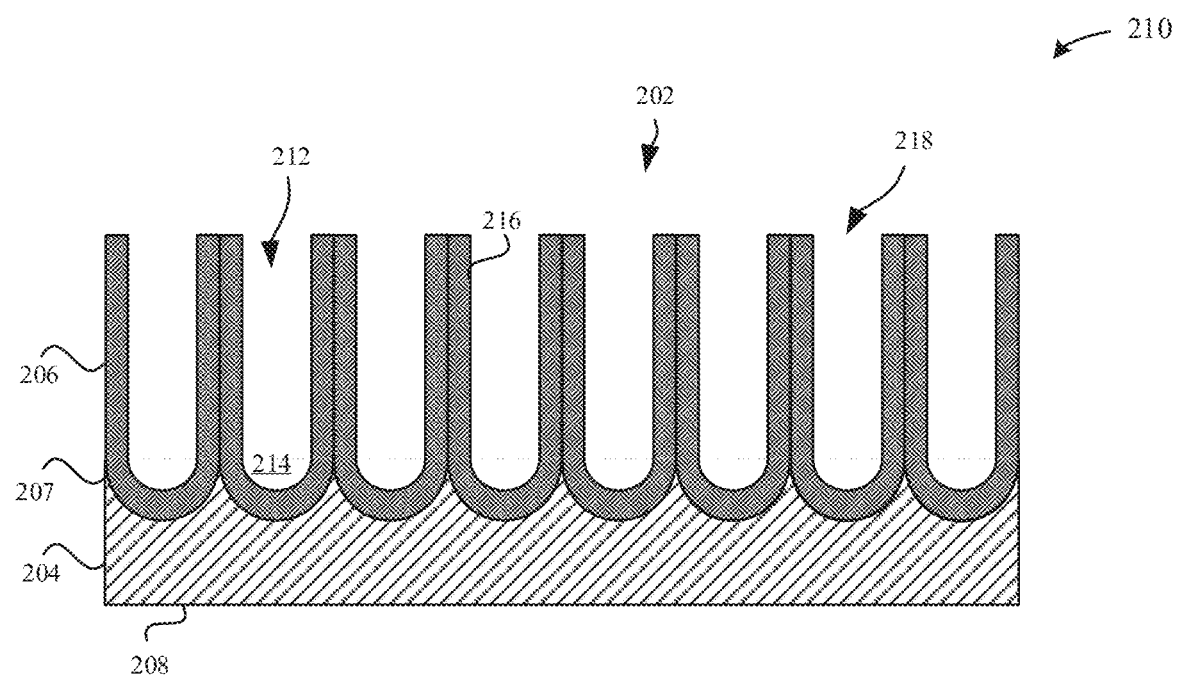

FIG. 2B illustrates an anodized part 210, in accordance with some embodiments. For example, the anodized part 210 corresponds to the metal substrate 204 after undergoing the anodization process. As illustrated in FIG. 2B, a metal oxide layer 206 is formed from and overlays the metal substrate 204. The metal oxide layer 206 may include an external surface 202, where the external surface 202 of the metal oxide layer 206 may be generally parallel to a bottom surface 208 of the metal substrate 204. In some examples, the metal oxide layer 206 is formed as a result of an electrolytic anodizing process. In particular, during the electrolytic anodizing process, a portion of the metal substrate 204 is converted or consumed by the conversion to the metal oxide layer 206.

According to some examples, the metal oxide layer 206 has a thickness between about 1 micrometer and several tens of micrometers. In some examples, the thickness is between about 5 micrometers and about 15 micrometers.

According to some embodiments, the metal oxide layer 206 includes pore structures 212 that extend from the external surface 202 of the anodized part 210 towards the metal substrate 204. The pore structures 212 may include bottom surfaces 214. The pore structures 212 are defined by pore walls 216 characterized as having generally columnar shapes that are elongated in a direction generally perpendicular to a central plane of the external surface 202 of the anodized part 210. The pore structures 212 include openings 218 that may be sealed via a sealing process, as described in greater detail herein.

According to some examples, the metal substrate 204 may include aluminum or an aluminum alloy. The aluminum alloy can include one or more alloying elements, such as zinc. As a result, when the metal substrate 204 is anodized, the zinc from the metal substrate 204 is partially incorporated into the metal oxide layer 206—although it may also be dissolved in the anodizing bath. However, it should be noted that regardless of the concentration of zinc present in the metal substrate 204, there is at most about 1% of zinc from the metal substrate 204 that is incorporated into the metal oxide layer 206. For example, if the metal substrate 204 includes 5.5% zinc, there would be a maximum of 1% of zinc incorporated into the metal oxide layer 206 from the metal substrate 204. Additionally, any contribution of zinc from the metal substrate 204 would show a continuous decline in concentration from the metal substrate/metal oxide layer interface 207 and drop towards the external surface 202 of the metal oxide layer 206. In other words, the concentration of zinc contributed from the metal substrate 204 is greatest at the metal substrate/metal oxide layer interface 207. In contrast, the concentration of zinc in the metal oxide layer 206 that is contributed from a zinc-based sealing solution is greatest at the external surface 202 of the metal oxide layer 206.

Figure 2C:
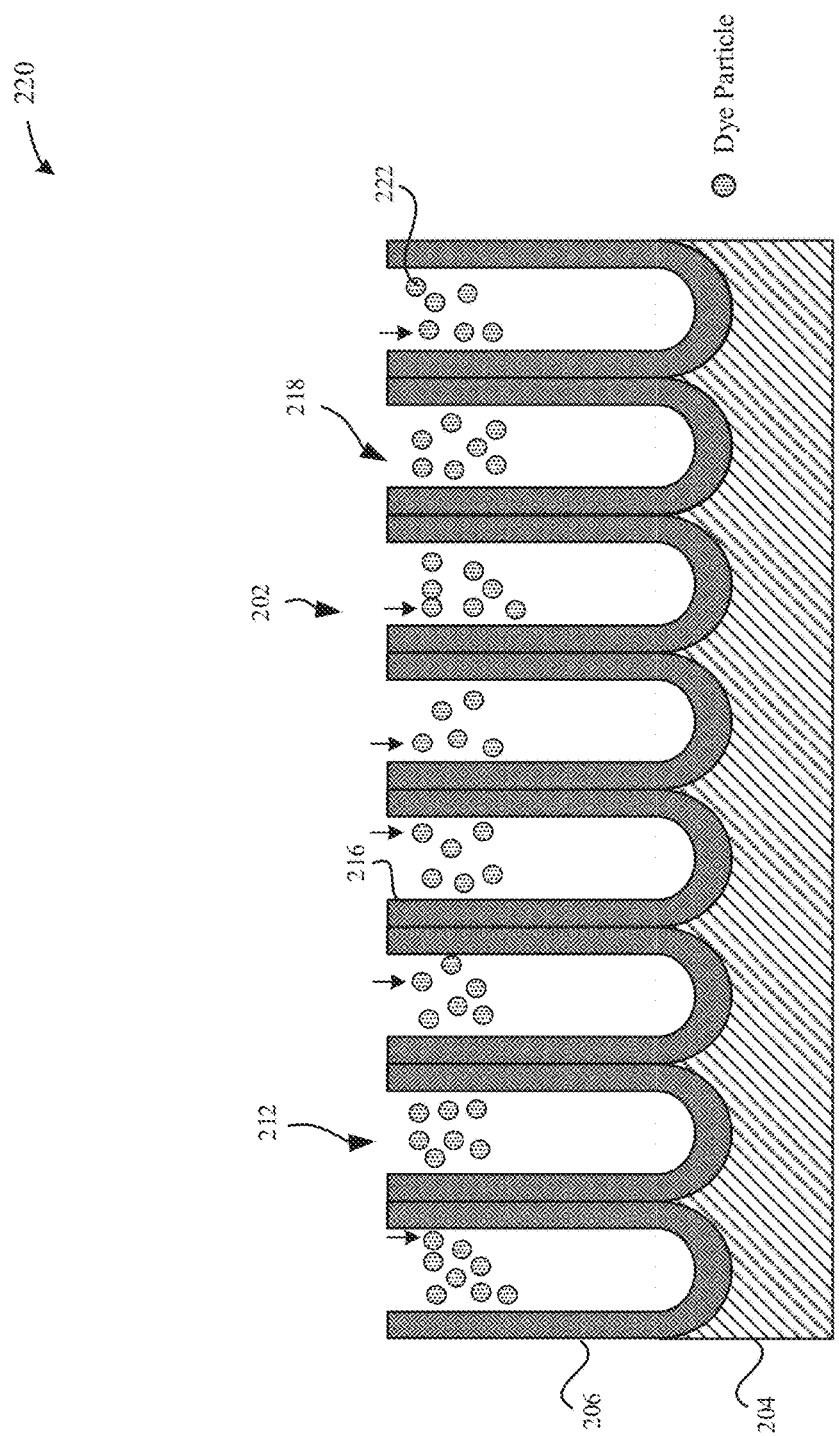

FIG. 2C illustrates a dyed part 220 while undergoing an optional dyeing process, in accordance with some embodiments. In particular, FIG. 2C illustrates that the dyed part 220 includes dye particles 222 that are deposited within the pore structures 212 from the dye solution while dyeing the anodized part 210. The dyed part 220 may be dyed a wide spectrum of colors through organic dyeing of the metal oxide layer 206. In some examples, the colors may be tuned by adjusting the parameters of the composition of the dye bath, such as concentration of the dye particles 222, pH level, time, and/or temperature of the dye bath. However, by maintaining a constant bath composition, the pH level, time, and/or temperature may be adjusted in order to fine-tune the dyed color to within DE of <1 of any given color target. As the metal oxide layer 206 is highly porous, the pore structures 212 should be sealed once the dye particles 222 are deposited into the pore structures 212 so as to permanently lock in the dyed color of the dyed part 220. In some examples, this is particularly true of sulfuric acid anodizing performed in accordance with Type II anodizing of Mil A 8625. Indeed, this type of metal oxide coatings are mesoporous (i.e., ~$10^{11}$ pores per square centimeter, ~20 nm diameter of good wettability and very high aspect ratio).

FIG. 2C illustrates that the dye particles 222 from the dye solution diffuse into the pore structures 212 during the dyeing process. According to some embodiments, the dye particles 222 may be distributed within the pore structures 212 in a random distribution or a uniform distribution. For example, by uniformly distributing the dye particles 222 within the pore structures 212, the entire metal oxide layer 206 may be generally dyed a uniform color throughout. During the dyeing process, the dye particles 222 diffuse into the pore structures 212, the dye particles 222 bind to sites of the pore walls 216 of the pore structures 212. However, as the dyeing process continues, these dye particles 222 begin to reach a beyond saturation point that corresponds to the amount and/or size of the dye particles 222 present in the pore structures 212 that caps the opening 218 and prevents other dye particles 222 from diffusing into the pore structures 212 to reach the bottom surfaces 214. As a result, the concentration of dye particles 222 may be greater at the external surface 202 than in the bottom surfaces 214.

Figure 2D:
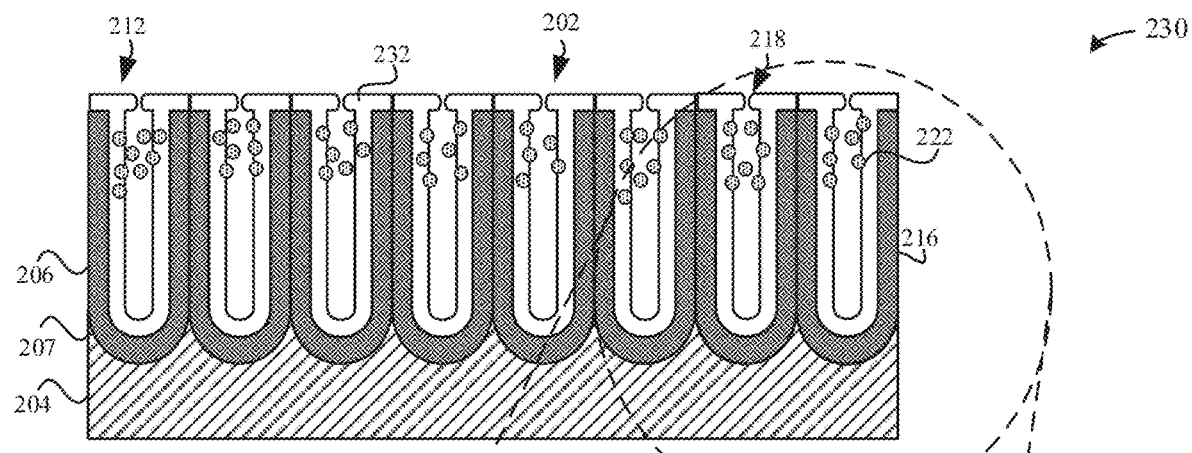

FIG. 2D illustrates a partially-sealed part 230 while undergoing a hydrothermal sealing process, in accordance with some embodiments. In some examples, the partially-sealed part 230 represents the dyed anodized part 220 during the hydrothermal sealing process. Although FIG. 2D illustrates dye particles 222 included within the pore structures 212, it should be noted that the dyeing process is optional, and the sealing process may also be performed on the non-dyed anodized part 210.

According to some embodiments, the dyed part 220 is exposed to a sealing solution. The sealing process involves hydrating the amorphous alumina surfaces of the pore walls 216 to a gel of boehmite ($Al_2O_3.H_2O$) and/or bayerite ($Al_2O_3.3H_2O$) such that the amorphous aluminum material swells and closes the openings 218 of the pore structures 212. The sealing process may be enhanced by using zinc acetate which additionally precipitates metal hydroxides in the pore structures 212 and accelerates the sealing process. In some examples, the hydrothermal sealing process may be performed in steam, hot water (e.g., at or near boiling temperature so as to reduce smutting), or at a temperature as low as about 70° C. The hydrothermal sealing process causes precipitation of hydrated aluminum oxide (e.g., boehmite, etc.). In particular, the hydrothermal sealing process causes swelling of the aluminum oxide of the metal oxide layer 206 while immersed in the sealing solution. Swelling of the aluminum oxide causes the openings 218 to narrow, thereby minimizing external elements from diffusing into the pore structures 212. Swelling of the openings 218 may also cause oxidized fragments or metal oxide material to be retained within the metal oxide layer 206. During the hydrothermal sealing process, the alumina (of aluminum oxide) is converted to a hydrated material 232, such as aluminum oxide hydroxides (e.g., boehmite, diaspore, etc.) that results in swelling or volume increase of the oxide surfaces to partially close or partially seal the openings 218 of the pore structures 212. In some examples, the hydrated material 232 uniformly lines the pore walls 216 of the pore structures 212. The hydrated material 232 may refer to generally insoluble hydroxide material.

It should be noted that the sealing process locks the dye particles 222 into the pore structures 212, and protects the pore structures 212 from stains, dirt, external contaminants, and the like. The hydrothermal sealing process may lock the color from the dyeing process without any further changes. Indeed, locking the dye color within the pore structures 212 is important in the consumer electronics industry where uniform color between many dyed parts and an overall, uniform cosmetic appearance of metallic surfaces is highly valued in attracting consumers.

Although it should be noted that it is possible for the sealing process to cause further color changes, such as from bleeding of the dye particles 222 into the sealing bath having the sealing solution. This color change may be quantified using a reflectance spectrophotometer that quantifies the color according to a CIE L*a*b* color standard that compares the change in color dE94 before and after the sealing process.

Figure 2E:
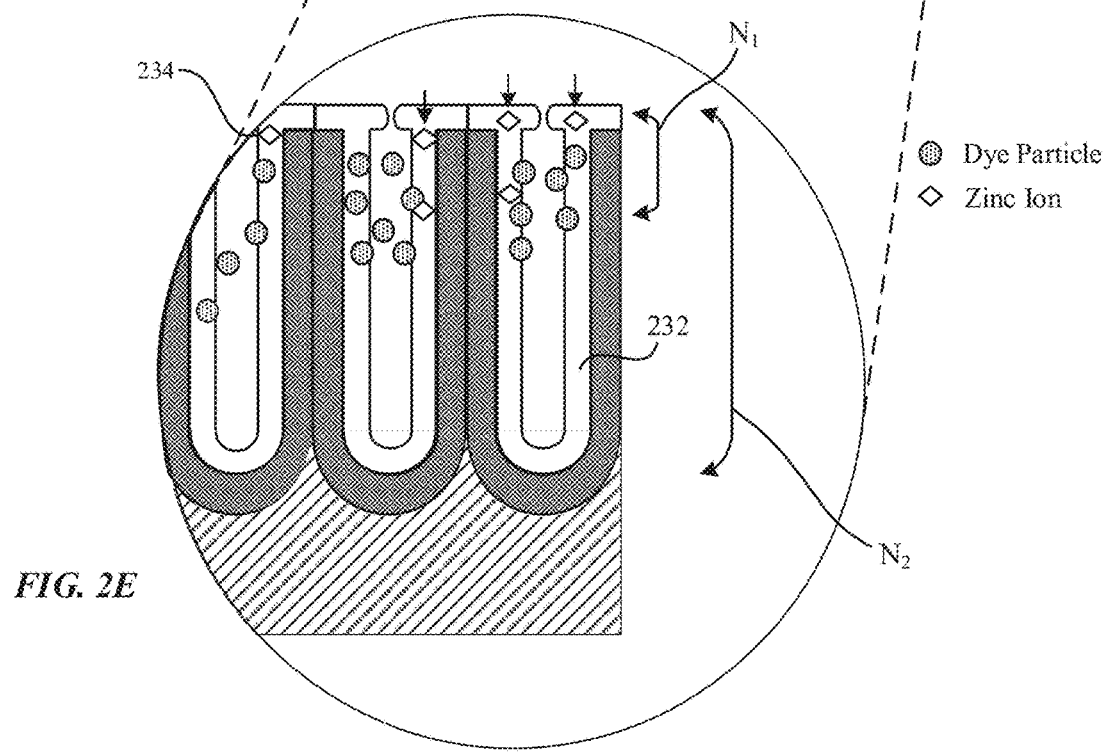

FIG. 2E illustrates a magnified cross-sectional view of the partially-sealed part 230, in accordance with some embodiments. According to some embodiments, and as illustrated in FIG. 2E, the sealing solution includes zinc acetate which additionally precipitates metal hydroxides in the pore structures 212 and accelerates the sealing process. For example, a similar seal performance to that achieved by immersion in boiling water or exposure to steam for about five minutes is achieved within about 30 seconds using zinc acetate. Indeed, the presence of zinc in the zinc acetate sealing solution may catalyze the hydration reaction. Moreover, zinc is also incorporated into the hydrated material 232, such as in the form of zinc hydroxide. The zinc hydroxide may further plug the openings 218 of the pore structures 212, thereby leading to retention of the dye particles 222 within the pore structures 212. Beneficially, zinc acetate renders the hydrothermal sealing process less acutely sensitive to contamination (e.g., sulfates, phosphates, silicates, chlorides, etc.), to pH fluctuations, and to temperature fluctuations. Furthermore, zinc hydroxide has lower water solubility than nickel hydroxide, which is more beneficial for sealing the pore structures 212.

According to some examples, the sealing solution includes zinc acetate at a concentration of between about 1 g/L to about 10 g/L. In some examples, the sealing solution includes zinc acetate at a concentration of 7 g/L. In some examples, the pH of the sealing solution is 5.5+/−0.5 using acetic acid. A surfactant (e.g., naphthalene sulfonic acid (NSA) or ethylenediaminetetraacetic acid (EDTA), etc.) is added at a concentration of 1-3 g/L. In some examples, the dyed part 220 and/or the anodized part 210 is exposed to the sealing solution for at least 20 seconds. In some examples, the sealing exposure time is between 15 minutes and about 60 minutes. In other examples, the sealing exposure time is between about 1-2 minutes. The sealing solution may also include chelating agents, and may also include pH stabilizers, and "anti-smutting" additives.

As illustrated in FIG. 2E, the hydrated material 232 that lines the pore walls 216 includes zinc ions 234 from the sealing solution. The zinc ions 234 diffuse into the pore structures 212 from the sealing solution. As illustrated in FIG. 2E, although the hydrated material 232 may uniformly line the pore walls 216, the zinc ions 234 may also be randomly distributed throughout the hydrated material 232. In some embodiments, the zinc ions 234 may be uniformly dispersed throughout the thickness of the metal oxide layer 206, as described in greater detail with reference to FIG. 2H and FIG. 10. In some embodiments, the zinc ions 234 from the sealing solution show a continuous increase in concentration from the metal substrate/metal oxide layer interface 207 and towards the external surface 202 of the metal oxide layer 206. In other words, the concentration of zinc contributed from the sealing solution is greatest at the external surface 202. Indeed, during the hydrothermal sealing process, the zinc ions 234 that diffuse into the pore structures 212 may block or prevent other zinc ions 234 from diffusing any deeper into the pore structures 212. As such, the concentration of zinc in the pore structures 212 drops sharply away from the external surface 202. For example, FIG. 2E illustrates that the pore structures 212 have a pore length of $N_2$, and the presence of zinc ions 234 has a penetration depth of $N_1$, where $N_2 > N_1$.

FIG. 2F illustrates a sealed part 240 subsequent to the hydrothermal sealing process, in accordance with some embodiments. Although FIG. 2F illustrates dye particles 222 included within the pore structures 212, it should be noted that the dyeing process is optional, and the sealing process may also be performed on the non-dyed anodized part 210. In contrast to the partially-sealed part 230, the openings 218 of the pore structures 212 of the sealed part 240 are fully sealed with the seal 242 so as to prevent the dye particles 222 from leaching out of the pore structures 212. The seal 242 includes hydrated material 232 (e.g., aluminum oxide hydroxides, etc.). In particular, the aluminum oxide hydroxides include boehmite, diaspore, and the like. In some examples, the aluminum oxide hydroxides has a greater volume than the aluminum oxide. The hydrated material 232 may make up the seal 242 that seals in the openings 218 of the pore structures 212. According to some embodiments, the sealed part 240 includes uniform levels of hydrated material 232 along the pore walls 216 of the pore structures 212. In some examples, the hydrated material 232 forms the seal 242 that generally corresponds to the external surface 202 of the anodized part 210.

FIG. 2G illustrates a magnified cross-sectional view of the sealed part 240, in accordance with some embodiments. In particular, FIG. 2G illustrates that the concentration of zinc ions 234 present in the metal oxide layer 206 is greatest towards the external surface 202. As illustrated in FIG. 2G, the concentration of the zinc ions 234 is greater at the openings 218 of the pore structures 312 and the concentration of the zinc ions 234 tapers off towards the bottom surfaces 214 of the pore structures 212. In some examples, the sealed part 240 of FIG. 2G may have a surface concentration at the external surface 202 of the metal oxide layer 206 between about 3 wt % to about 7 wt % of zinc. In some embodiments, the zinc ions 234 of the hydrated material 232 progressively fills the pore structures 212 such that there is a zinc gradient throughout the thickness of the metal oxide layer 206. Since the zinc-enhanced seal (aluminum oxide hydroxide with zinc or zinc hydroxide incorporated) has increased impedance properties relative to the aluminum oxide material, the metal oxide layer 206 is characterized as having an ionic conductivity and/or impedance gradient due to the gradient of zinc added therein.

Moreover, it should be noted that the concentration of zinc included within the metal oxide layer 206 that is contributed by a zinc-based sealing solution may be generally independent of the chemistry of the dye solution. Indeed, very few organic dyes include zinc. Moreover, those few organic dyes that include zinc results in less than 1 wt % of zinc incorporated into the sealed anodized layer, even when dyed to saturation. Thus, the concentration of zinc that is included within the metal oxide layer that is contributed by zinc-based dyes is less than 1 wt %. In other words, the external surface concentration of zinc between about 3 wt % to about 7 wt % of zinc would not be attributed in the majority to use of zinc-based dyes.

Surprisingly, when zinc acetate is used in an otherwise direct substitution for nickel acetate as a sealing solution, there is deeper penetration of the zinc ions 234 into the pore structures 212 than nickel ions. Furthermore, with reference to FIG. 2G, zinc ions 234 show a more progressive drop-off in concentration throughout the length of the pore structures 212 than nickel ions. For instance, as will be described in greater detail with reference to FIG. 9, if the metal oxide layer 206 has a thickness of 12 micrometers, then anodized parts using zinc-based seals will demonstrate between about 1 wt %-2 wt % of zinc even at a thickness of 6 micrometers (or 50% of the thickness of the metal oxide layer). In contrast, anodized parts using nickel-based seals will demonstrate about 0 wt % of nickel at a thickness of 6 micrometers. This unexpected result shows deeper penetration of zinc ions 234 than nickel ions into the pore structures 212. Moreover, this demonstrates a sharper drop-off of the concentration of nickel ions present in the metal oxide layer 206. Since the zinc ions 234 penetrate deeper into the pore structures, the metal oxide layer 206 is associated with reduced admittance and reduced ionic conductivity relative to the nickel-based seals. Beneficially, zinc-based seals will result in better corrosion resistance and better UV radiation attenuation. FIG. 2G illustrates that the concentration of zinc ion 234 in the pore structures 212 drops sharply away from the external surface 202. For example, FIG. 2G illustrates that the pore structures 212 have a pore length of $N_2$, and the presence of zinc ions 234 has a penetration depth of $N_1$, where $N_2 > N_1$.

FIG. 2H illustrates a magnified cross-sectional view of the sealed part 240, in accordance with some embodiments. In particular, FIG. 2H illustrates that the concentration of zinc ions 234 within the pore structures 212 is generally uniform throughout the thickness of the metal oxide layer 206. Beneficially, the use of zinc-based seals may be able to enable more uniform generally uniform penetration of the zinc ions 234 of the hydrated material 232 within the pore structures 212, thereby providing generally uniform corrosion resistance throughout the metal oxide layer 206, greater and more uniform UV radiation attenuation throughout the metal oxide layer 206, and the like. The generally uniform concentration of zinc ions 234 and its benefits are unexpected and in sharp contrast to nickel acetate-based seals. The term generally uniform penetration may be defined as a generally uniform concentration of the zinc ions 234 throughout the thickness of the metal oxide layer 206. FIG. 2H illustrates that the concentration of zinc ion 234 has a penetration depth of $N_3$, where $N_2 = N_3$.

In some examples, it should be noted that if zinc acetate is used as the sealing solution, then there should be an absence of nickel ions (or general absence of nickel ions) present at the external surface 202 of the metal oxide layer 206, as indicated by FIG. 2G. Furthermore, it should be noted that if the metal substrate 204 includes zinc (i.e., zinc-based alloy), and a zinc-based sealing solution is used to seal the pore structures 212 of the metal oxide layer 206, then the zinc ions from the metal substrate 204 may be incorporated into the aluminum oxide material of the pore walls 216. However, the zinc ions from the metal substrate 204 do not contribute to the concentration of zinc ions that are included in the hydrated material 232 that fills the pore structures 212. Furthermore, it should be noted that the concentration of zinc ions 234 included in the metal oxide layer 206 is minimally affected regardless of the concentration of zinc present in the metal substrate 204. For example, if the metal substrate 204 includes 5.5% zinc, the maximum concentration of zinc as measured at the external surface 202 would be about 1 wt %.

In other examples, if the metal substrate 204 includes nickel (e.g., nickel aluminide, etc.), but utilizes a zinc-based sealing solution to seal in the pore structures 212 of the metal oxide layer, then the nickel ions from the metal substrate 204 do not make up the chemical structure of the hydrated material 232 that fills in the pore structures and seals the openings 218. Instead the nickel ions may only diffuse into the aluminum oxide material that constitutes the pore walls 216 of the metal oxide layer 206.

Figure 3:
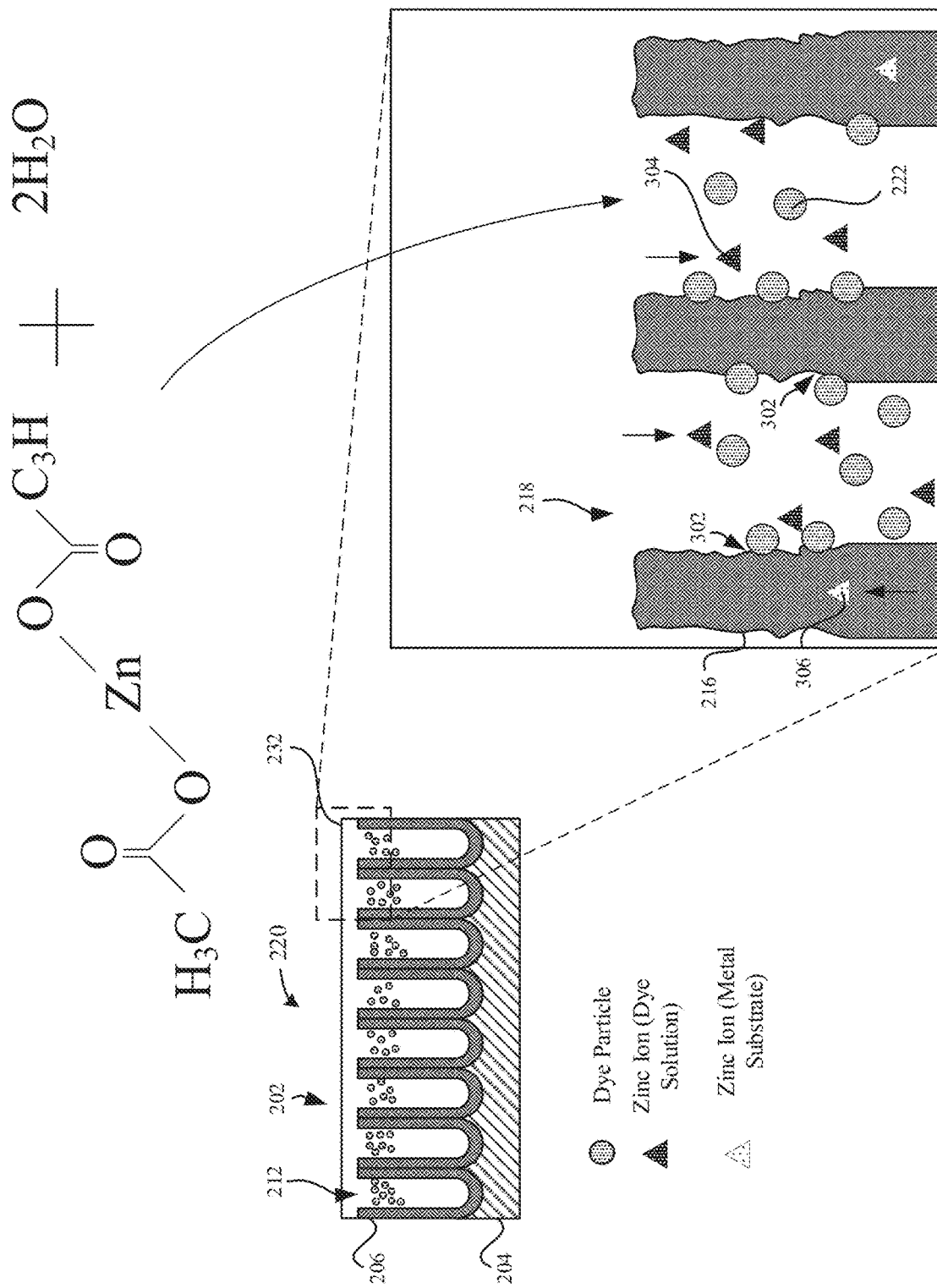
FIG. 3 illustrates a schematic diagram of a cross-sectional view of an anodized part during a sealing process, in accordance with some embodiments.

FIG. 3 illustrates a schematic diagram of a cross-sectional view of a dyed part 220 during a hydrothermal sealing process, in accordance with some embodiments. In particular, the dyed part 220 illustrated in FIG. 3 is shown as having a metal substrate 204 that includes zinc (i.e., zinc-based alloy). For example, during the anodization process, metal substrate—derived zinc ions 306 from the metal substrate 204 diffuse into the metal oxide layer 206. However, the external surface concentration of zinc is minimally affected by the contribution of the metal substrate—derived zinc ions 306. In some examples, the metal substrate 204 contributes ≤1 wt % of zinc measured at the external surface 202. Furthermore, it should be noted that the elemental profile of the metal substrate—derived zinc ions 306 is relatively flat or even declines towards the external surface 202.

As illustrated in FIG. 3, the dye particles 222 are bound to binding sites 302 of the pore walls 216 as a result of an optional dyeing process that is performed prior to the hydrothermal sealing process. As illustrated in FIG. 3, the dyed part 220 is exposed to a sealing solution that includes zinc salt, such as zinc acetate. In some examples, the zinc acetate is used at a concentration of between 1 g/L to 10 g/L of the sealing solution. The acetate anions from the zinc acetate solution may diffuse into the pore structures 212. In some examples, the acetate anions included within the pore structures 212 may be detected by using ion chromatography on a sample of pure de-ionized water, to which 30 wt % of nitric acid is added, where the sealed part 240 is immersed for between about 12-24 hours. This detection method is in contrast to what it utilized to detect the concentration of zinc that constitutes the aluminum oxide material of the pore walls 216.

The dye solution—derived zinc ions 304 are derived from the zinc acetate sealing solution. During the sealing process, the dye solution derived zinc ions 304 diffuse into the pore structures 212 via the openings 218. In some examples, the dye solution—derived zinc ions 304 make up the hydrated material 232 that plugs the openings 218 and fills in the pore structures 212. In some embodiments, the surface concentration of zinc is between about 3 wt % to about 7 wt % of zinc. In other words, the metal substrate—derived ions 306 contribute at most about 1 wt % of the surface concentration of zinc. Furthermore, even if the dye particles 222 are zinc-based, these zinc-based dye particles 222 contribute less than 1 wt % to the surface concentration.

In some embodiments, the concentration of the zinc is greater at the openings 218 of the pore structures 212 and the concentration tapers off towards the bottom surfaces 214 of the pore structures 212. In some examples, the zinc may have a peak concentration at the external surface 202 of the metal oxide layer 206 of about 7%. In some embodiments, the zinc ions 234 of the hydrated material 232 progressively fills the pore structures 212 such that there is a zinc gradient throughout the thickness of the metal oxide layer 206. Since a zinc-augmented seal has increased impedance properties relative to the aluminum oxide material, the metal oxide layer 206 is characterized as having an ionic conductivity and/or impedance gradient due to the gradient of zinc added therein.

Although not illustrated in FIG. 3, the pore structures 212 may also include a generally uniform concentration of zinc throughout the length of the pore structures 212, as indicated by FIG. 2H.

Figure 4:
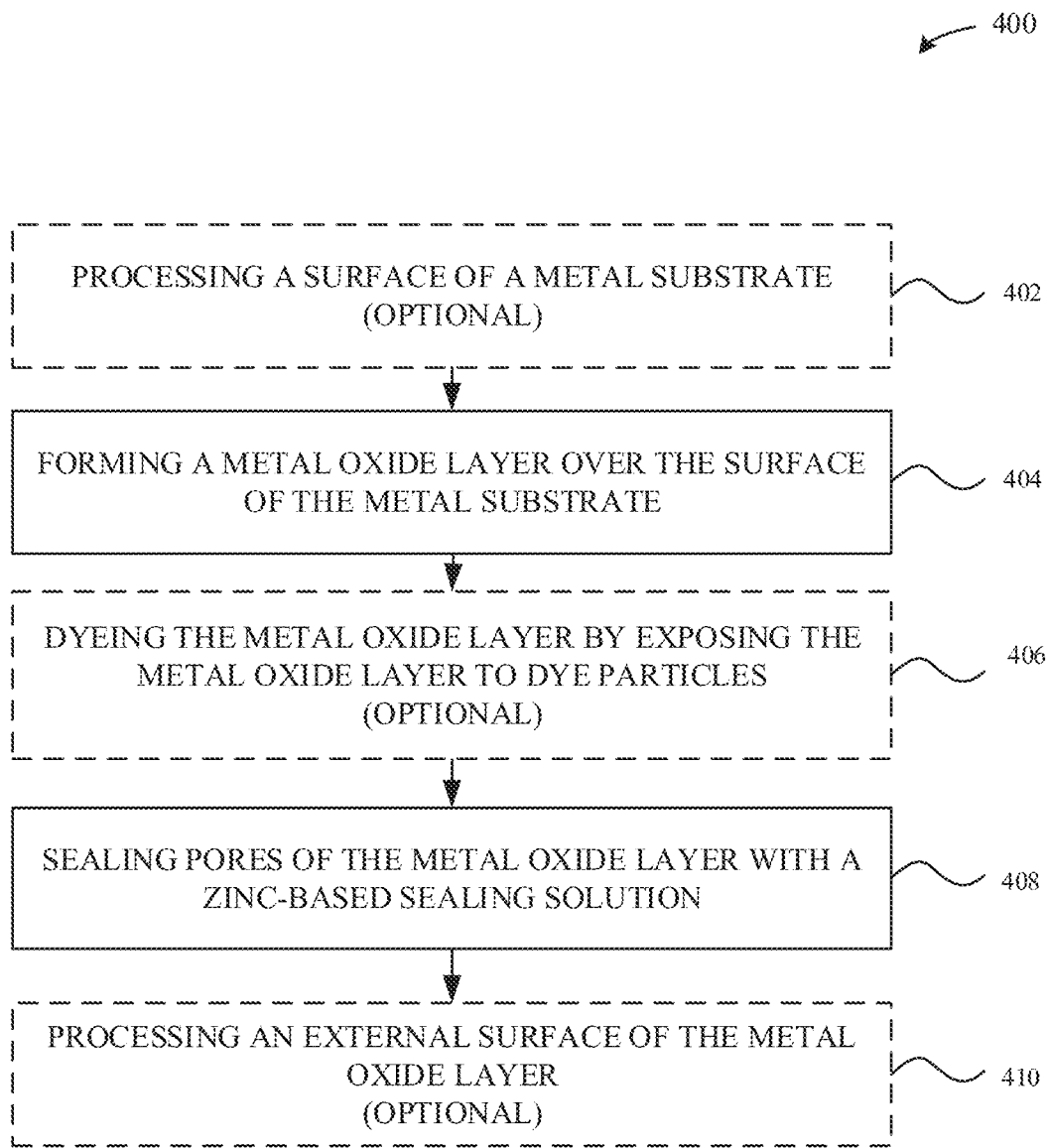
FIG. 4 illustrates a method for sealing an anodized part, in accordance with some embodiments.

FIG. 4 illustrates a method 400 for sealing a metal part, in accordance with some embodiments. As illustrated in FIG. 4, the method 400 optionally begins at step 402, where a surface of a part—e.g., a metal substrate 204—is optionally processed. In some examples, the surface of the metal substrate 204 is subject to a cleaning process, a texturizing process, a buffing process, or a polishing process. In particular, the texturizing process can be beneficial in providing a roughened external surface that can promote growth of the metal oxide layer 206 at those roughened regions.

At step 404, an anodization step is performed on the metal substrate 204. During the anodization process, a metal oxide layer 206 is formed from the metal substrate 204, in some examples, the metal oxide layer 206 may be formed through a thermal oxidation process or an electrolytic anodization process.

At step 406, the metal oxide layer 206 is optionally colored as a result of a dyeing process. During the dyeing process, the anodized part—e.g., the anodized part 210—is exposed to a dye solution bath. The anodized part 210 is submerged within the dye solution bath to yield the dyed part 220.

At step 408, the pore structures 212 of the dyed part 220 and/or the anodized part 210 are sealed via a sealing process according to some embodiments to form the sealed part 230. In some instances, sealing the pore structures 212 may be preferable in that sealing closes the pore structures 212 such that dye particles 222 are retained within the metal oxide layer 206. The sealing process includes exposing the anodized part 210 and/or dyed part 220 to a sealing solution that includes zinc salt (e.g., zinc acetate, etc.). The zinc acetate has a concentration of between 1 g/L to 10 g/L. In some examples, the zinc acetate is used at a concentration of 7 g/L. In some examples, the anodized part 210 is exposed to a sealing solution having a temperature >80° C. The solution has a conductivity of less than 200 microSiemens/cm. The pH of the solution is 5.5+/−0.5 using acetic acid. A surfactant (e.g., naphthalene sulfonic acid (NSA) or ethylenediaminetetraacetic acid (EDTA), etc.) is added at a concentration of 1-3 g/L. In some examples, the dyed part 220 and/or the anodized part 210 is exposed to the sealing solution for at least 20 seconds. In some examples, the sealing exposure time is between 15-60 minutes to achieve a thorough seal for a metal oxide layer 206 having a thickness between about 15-20 micrometers. In other embodiments, the sealing exposure time is between about 1-2 minutes to retain dye particles and block the openings 218 of the pore structures 212, but leave the bulk of the metal oxide thickness only partially sealed, and therefore, more mechanically compliant. In some examples, the sealing solution is maintained at 98° C.+/−2° C. and is continuously recirculated through a 10 micron filter and agitated with filtered air.

At step 410, the external surface 202 of the metal oxide layer of the sealed part 240 may be processed. For example, the external surface 202 is rinsed with de-ionized water.

Figure 5:
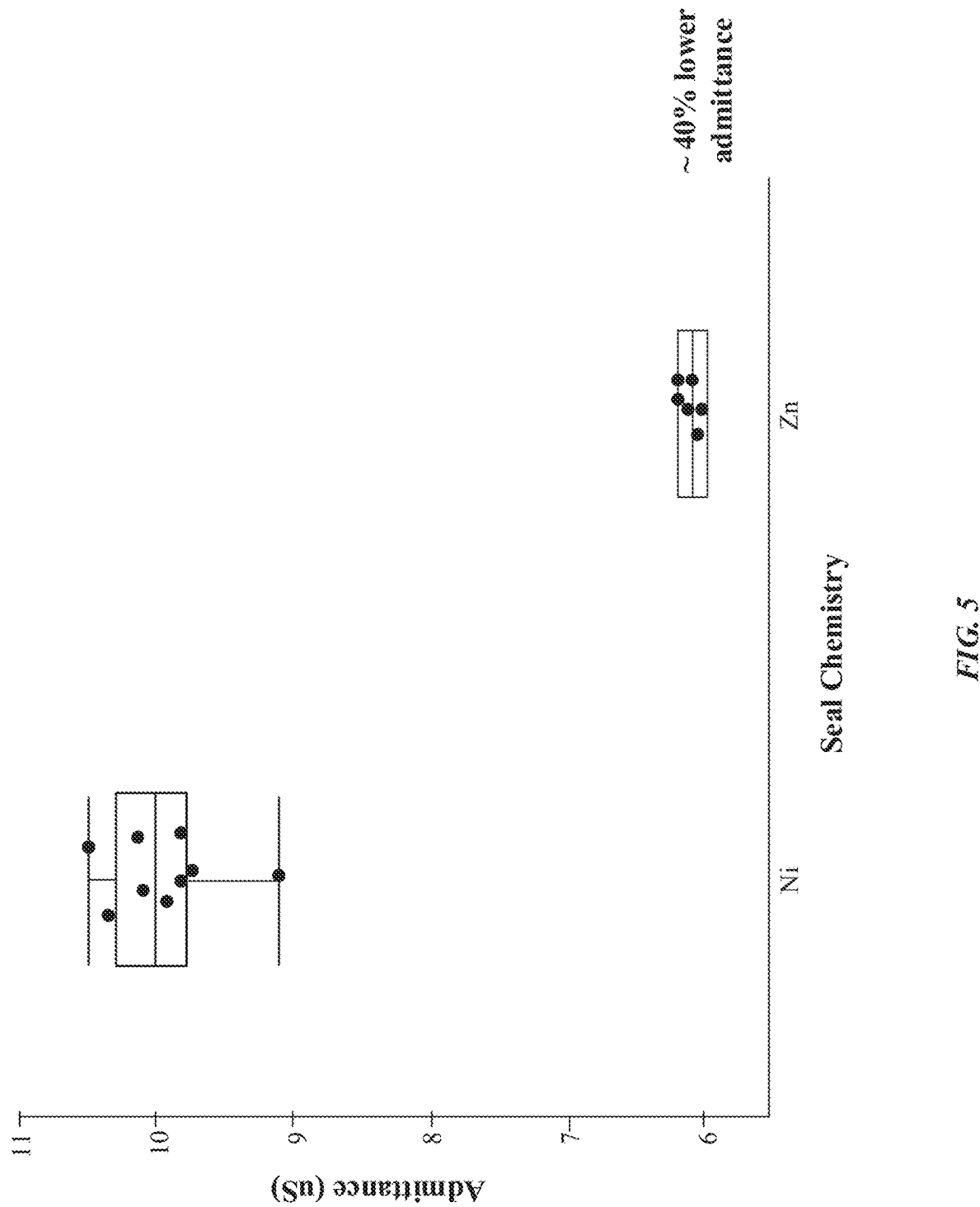
FIG. 5 illustrates an exemplary graph indicating a relationship of an admittance of a metal oxide layer as a function of a type of seal chemistry, in accordance with some embodiments.

FIG. 5 illustrates a graph indicating a relationship of an admittance of a metal oxide layer as a function of a type of seal chemistry, in accordance with some embodiments. In particular, admittance (as measured in accordance with ASTM B457) corresponds to an electrochemical resistance of the metal oxide layer 206. The admittance testing involves performing electrochemical impedance spectroscopy at a fixed frequency (e.g., 1 kHz). A conventional seal (e.g. one with a 1 kHz admittance value (measured in microSiemens in accordance with ISO 2931) of less than 400 times the reciprocal of its thickness (measured in microns)—when measured within 48 h of sealing—a specification set by Qualanod standard.) may be achieved in production by immersion in an aqueous solution of nickel acetate at 5-10 g/l and at temperatures of 96° C. or more, for a period of 15 minutes or more in the case of a Type II anodic oxide film with a film thickness of 10-15 microns.

In accordance with some exemplary trials, otherwise identical anodized parts with similar 12 micrometer anodized layer thickness were sealed using a nickel-base seal and a zinc-based seal at the same active chemistry concentrations, the same temperature, and for the same sealing exposure duration. In particular, anodized parts sealed using nickel acetate demonstrated an admittance value range between about 9 microSiemens to about 11 microSiemens. In contrast, anodized parts sealed using zinc acetate demonstrated about a 40% lower admittance. The anodized parts sealed using zinc acetate had an admittance value of about 6 microSiemens. The decrease in admittance correlates to reduce ionic conductivity of the metal oxide layer, thereby demonstrating improved corrosion resistance while using zinc-acetate seals.

Figure 6:
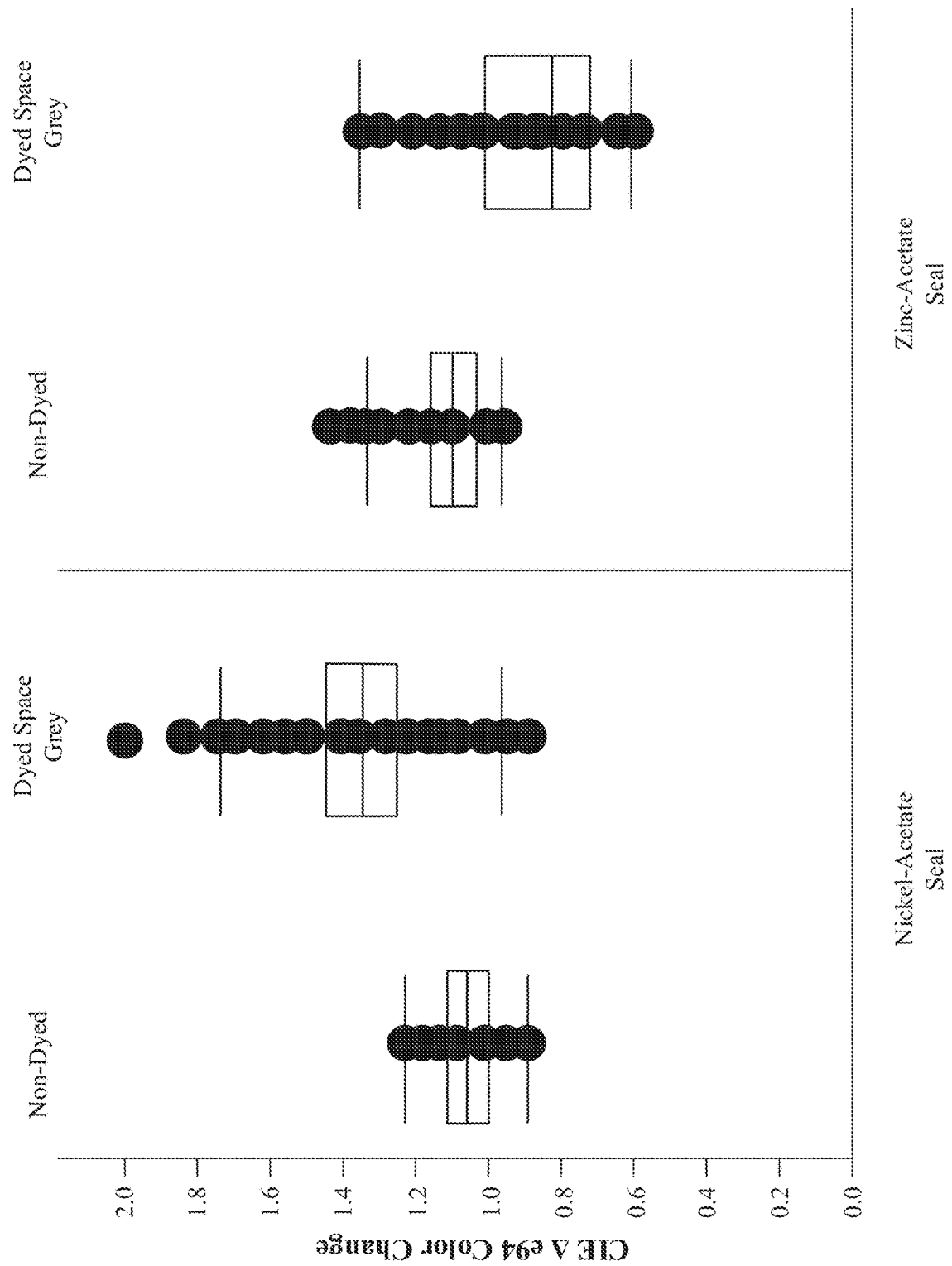
FIG. 6 illustrates an exemplary graph indicating a relationship of CIE dE94 color change as a function of a type of seal chemistry, in accordance with some embodiments.

FIG. 6 illustrates an exemplary graph indicating a relationship of CIE dE94 color change as a function of a type of seal chemistry, in accordance with some embodiments. A very wide spectrum of color is achievable through organic dyeing of anodic oxides. The colors can be tuned by adjusting the composition of the dye bath (concentration of colorants, and pH), and by adjusting the time and temperature of the dye bath. By maintaining a constant bath composition, pH and temperature, time may be used to precisely fine-tune color to within DE of <1 of any given color target during production. In some examples, the sealing process is utilized to lock the color of the dyed parts. However, the sealing processes can result in further color changes—perhaps most notably due to bleeding of dye components into the hot aqueous seal bath during the initial stages of sealing. This can be quantified by performing color measurements (e.g. using a reflectance spectrophotometer to quantify color according to a color standard such as CIELab) both before and after the sealing process, and assessing the color change as a dE94 measure of the difference between the two colors.

According to the exemplary trials, samples that were not dyed (i.e., retaining a clear "silver" appearance of the aluminum surface) and were sealed using nickel acetate or zinc acetate. Samples that were non-dyed ("silver" color) and sealed with nickel acetate demonstrated a dE94 color change of between about 0.9 to about 1.2. In contrast, non-dyed samples that were sealed with zinc acetate (3.0 g/L) demonstrated a dE94 color change of between about 0.9 to about 1.3.

Samples that were dyed a "space grey" color of (L*>50) and sealed using nickel acetate demonstrated a dE94 color change of between about 0.8 to about 2.0. In contrast, the samples that were sealed using zinc acetate (3.0 g/L) demonstrated a smaller range of dE94 color change of between about 0.6 to about 1.4. Accordingly, anodized parts sealed using zinc acetate demonstrated significantly less color change than those anodized parts sealed using nickel acetate. Based on this observation, it may be inferred that zinc acetate more quickly plugs and seals the openings 218 of the pore structures 212 relative to nickel acetate during the sealing process.

Figure 7:
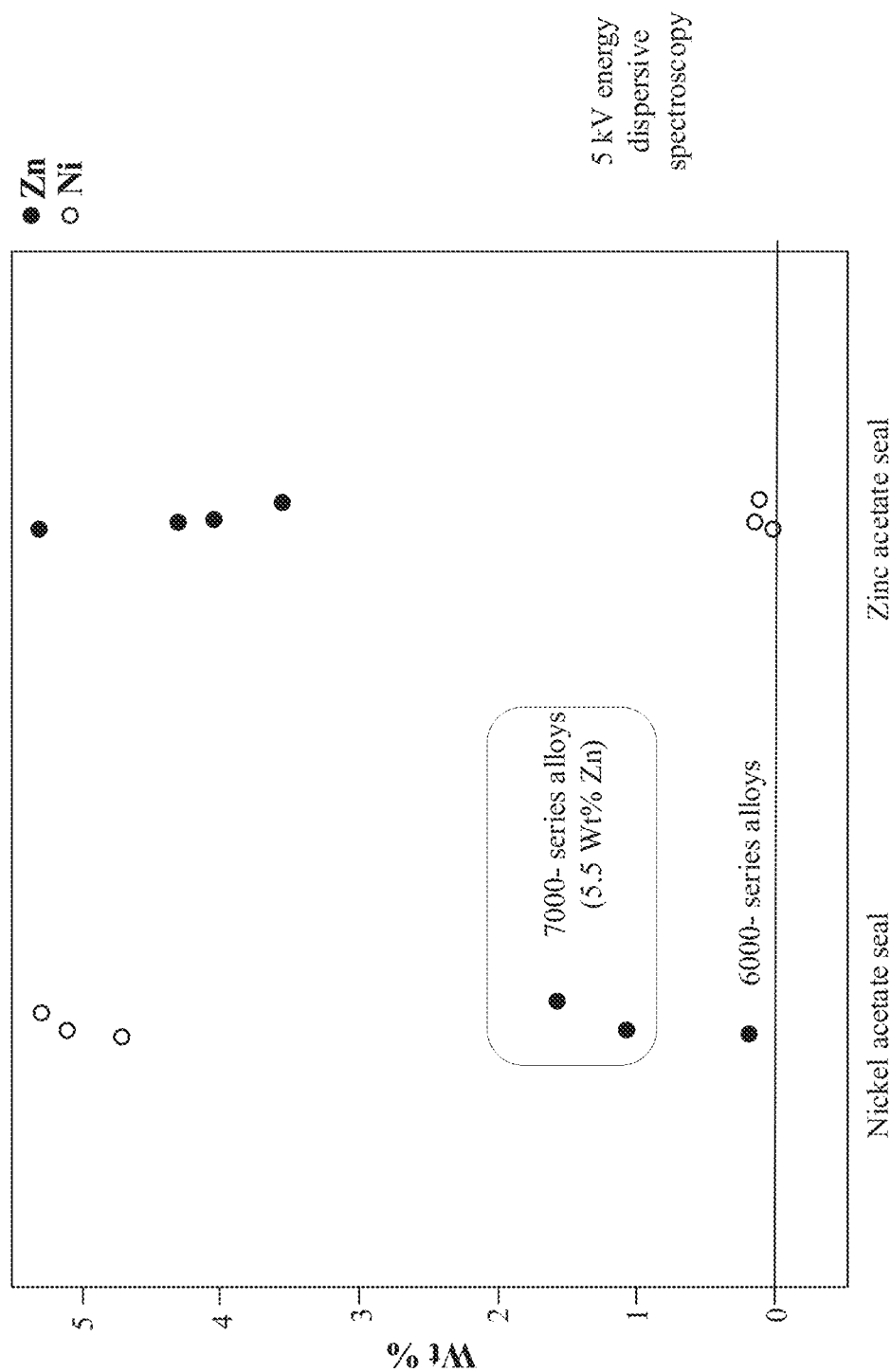
FIG. 7 illustrates an exemplary graph indicating concentrations of nickel/zinc at a surface of a metal oxide layer as a function of a type of seal chemistry, in accordance with some embodiments.

FIG. 7 illustrates an exemplary graph indicating concentrations of nickel/zinc at a surface of a metal oxide layer as a function of a type of seal chemistry, in accordance with some embodiments. In particular, samples of anodized parts were exposed to nickel acetate sealing solutions and zinc acetate sealing solutions. FIG. 7 illustrates anodized parts formed of 6000-series alloy having magnesium and silicon as alloying elements. As a baseline, the 6000-series alloy demonstrates about 0 wt % of zinc at the surface of the metal oxide layer. As another baseline, 7000-series alloy having 5.5 wt % of zinc was measured to have less than 2 wt % of zinc. Thus, FIG. 7 indicates that regardless of the concentration of zinc present in the alloy, there is at most about 1 wt % of zinc from the alloy that is incorporated into the metal oxide layer. These anodized parts were exposed to 5 kV energy dispersive x-ray spectroscopy.

Anodized parts sealed with zinc acetate sealing solution demonstrated a surface concentration of zinc between about 4-5.5 wt % and a surface concentration of nickel of about 0 wt %. In contrast, anodized parts sealed with nickel acetate demonstrated a surface concentration of nickel between about 4.5-5.5 wt % and a surface concentration of zinc of about 0 wt %. Accordingly, the use of the zinc acetate sealing solution does not impart any presence of nickel at the surface of the metal oxide layer.

Figure 8:
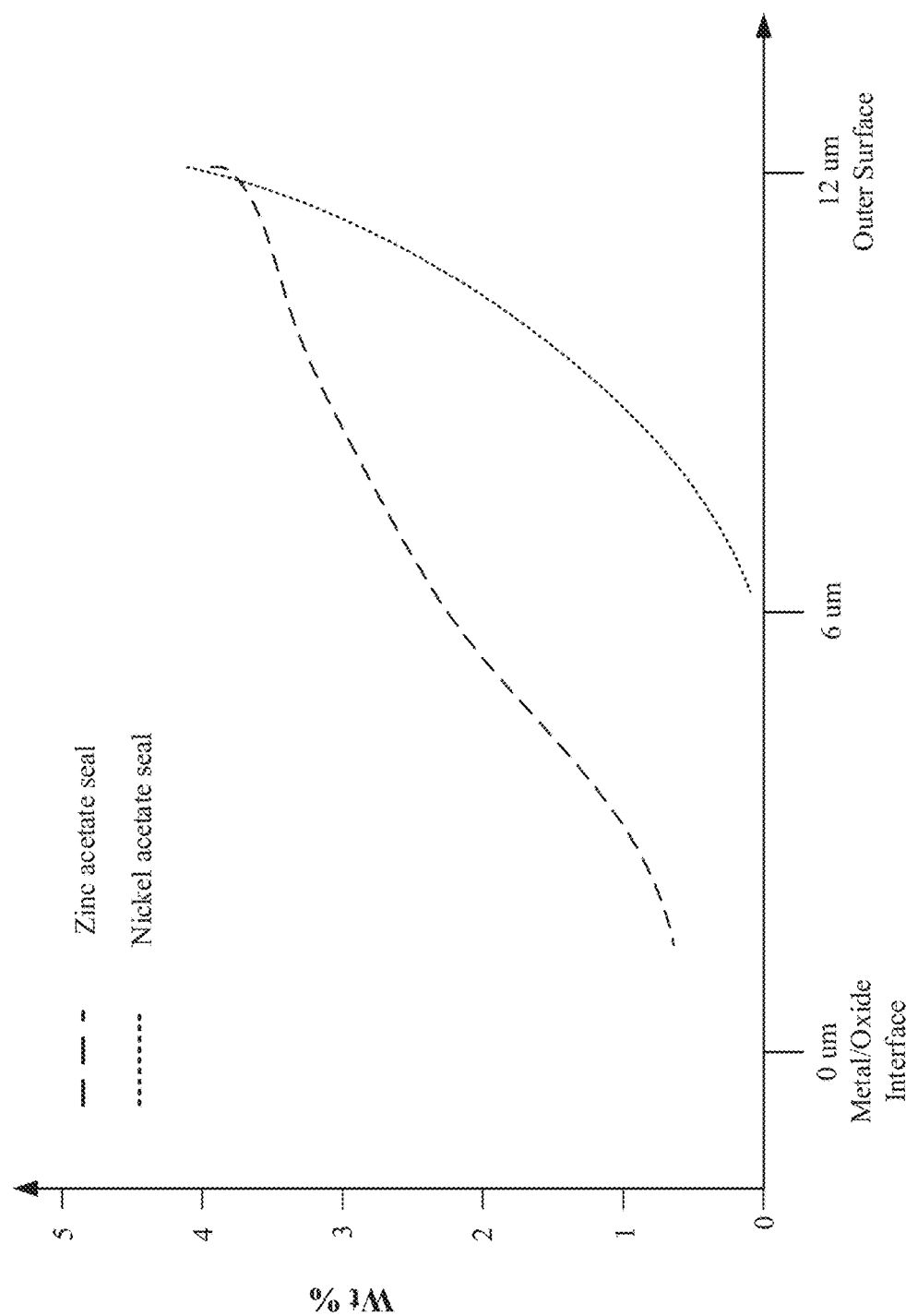
FIG. 8 illustrates an exemplary graph indicating concentrations of nickel/zinc included in a metal oxide layer as a function of a type of seal chemistry, in accordance with some embodiments.

FIG. 8 illustrates an exemplary graph indicating concentrations of nickel/zinc included in a metal oxide layer as a function of a type of seal chemistry, in accordance with some embodiments. In particular, samples of anodized parts were exposed to nickel acetate sealing solutions and zinc acetate sealing solutions. FIG. 8 illustrates that these anodized parts have metal oxide layers having a thickness of about 12 micrometers. The samples of anodized parts sealed using a zinc acetate sealing solution demonstrated about 3-4 wt % of zinc at the surface of the metal oxide layer. Notably, at a thickness of 6 micrometers (or 50% of the thickness of the metal oxide layer), the anodized parts sealed using zinc acetate demonstrated a slower drop-off with between about 1 wt %-2 wt % of zinc at 50% of the thickness of the metal oxide layer.

In contrast, anodized parts using nickel acetate sealing solution demonstrated about 3-4 wt % of nickel at the surface of the metal oxide layer. However, at a thickness of 6 micrometers, the anodized parts sealed using nickel acetate demonstrated a sharper drop-off with about 0 wt % of nickel at 50% of the thickness of the metal oxide layer. Accordingly, these results demonstrate the unexpected result that use of zinc-based seals leads to deeper penetration of zinc ions into the pore structures of the metal oxide layer. Since the zinc ions penetrate deeper into the pore structures than nickel ions, and these zinc ions reflect the presence of additional metal hydroxide precipitates which help to block the porosity and boost impedance, the metal oxide layer that is sealed with zinc acetate demonstrates reduced admittance and reduced ionic conductivity relative to the nickel-based seals.

Figure 9A:
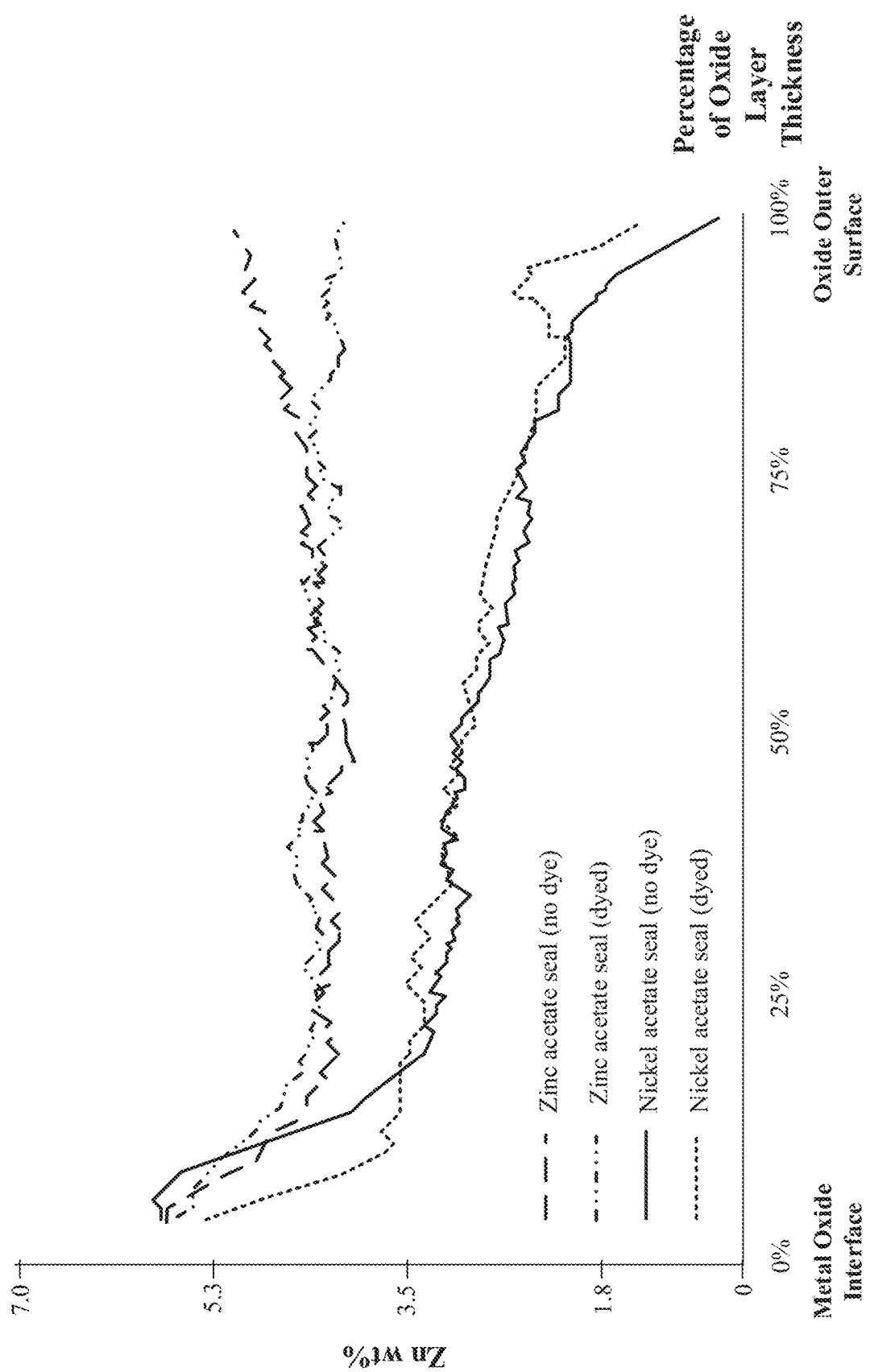
FIGS. 9A-9B illustrate exemplary graphs indicating concentrations of nickel/zinc through a thickness of a metal oxide layer as a function of a type of seal chemistry, in accordance with some embodiments.
Figure 9B:
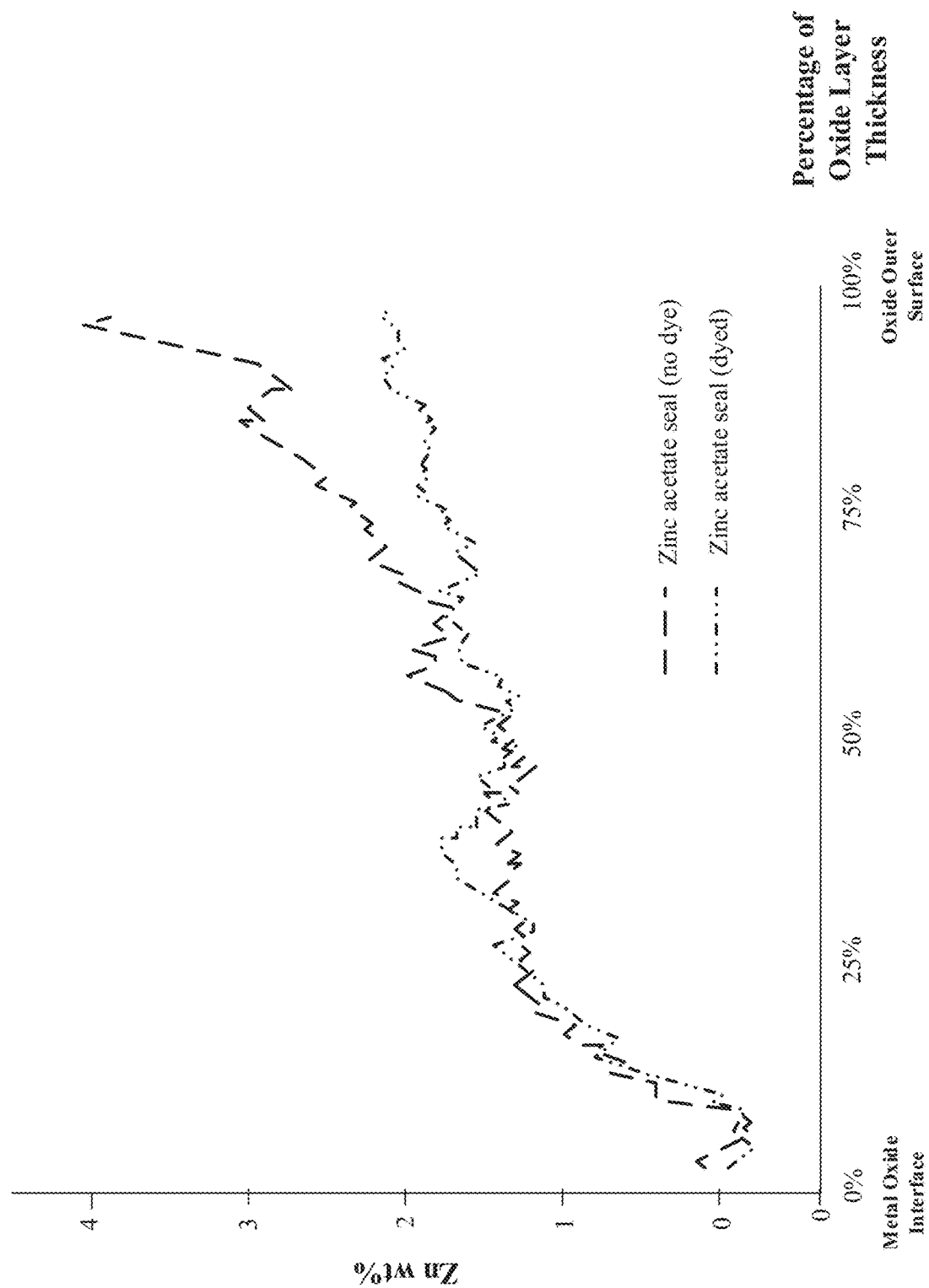

FIGS. 9A-9B illustrate exemplary graphs indicating concentrations of nickel/zinc through a thickness of a metal oxide layer as a function of a type of seal chemistry, in accordance with some embodiments. In particular, anodized parts were derived from a zinc-rich substrate alloy. In particular, dyed anodized parts and non-dyed anodized parts were sealed using nickel acetate and zinc acetate. Energy dispersive x-ray spectroscopy was used to detect a distinctive profile of zinc concentration through the thickness of these anodized parts that were sealed using nickel acetate and zinc acetate. In particular, these anodized parts were derived from a zinc-rich substrate alloy.

FIG. 9A illustrates that dyed anodized parts and non-dyed anodized parts that were sealed using nickel acetate demonstrated a highest concentration of zinc at the metal substrate/metal oxide interface of about 5 wt %. However, the concentration of zinc decreased towards the external surface of the metal oxide layer to about 0 wt % of zinc at the external surface. One of ordinary skill in the art would have interred that the highest concentration of zinc at the metal substrate/metal oxide interface is not unexpected because zinc ions that diffuse from the zinc-rich substrate alloy are likely to taper off in concentration towards the external surface.

Contrarily, FIG. 9A illustrates that those anodized parts that were sealed using zinc acetate demonstrated about 4-5 wt % of zinc throughout the thickness of the metal oxide layer, regardless of whether these anodized parts were dyed or non-dyed. Additionally, FIGS. 9A-9B illustrate the surprising and unexpected result that anodized parts sealed using zinc acetate show a relatively uniform concentration of zinc throughout the thickness of the metal oxide layer. In other words, the concentration of zinc cannot be solely attributed to the zinc-rich based alloy. As such, zinc ions from the zinc acetate sealing solution are incorporated into the metal oxide layer from the zinc-rich substrate are readily dissolved in the acidic anodizing bath and are likely to taper off in concentration towards the external surface which experiences longer exposure time to the acidic anodizing bath.

FIG. 9B illustrates an exemplary graph that demonstrates the Δ in wt % of zinc throughout the thickness between anodized parts sealed using zinc acetate and those anodized parts sealed using nickel acetate. FIG. 10B illustrates that the Δ in wt % of zinc is greatest at the outer surface of the metal oxide layer.

Figure 10:
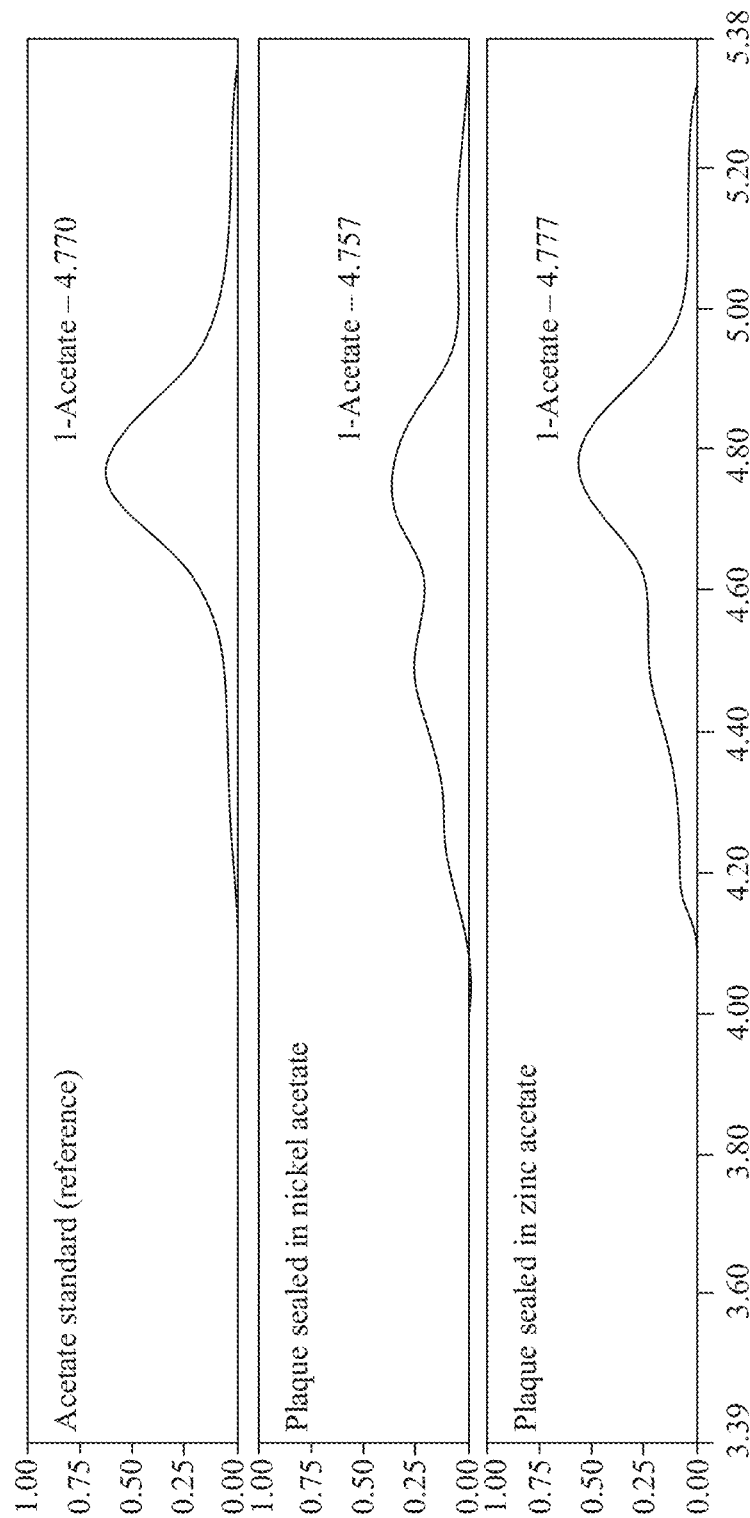
FIG. 10 illustrates an exemplary graph indicating concentrations of nickel acetate/zinc acetate in a metal oxide layer as a function of a type of seal chemistry, in accordance with some embodiments.

FIG. 10 illustrates an exemplary graph indicating concentrations of nickel acetate and zinc acetate in a metal oxide layer as a function of a type of seal chemistry, in accordance with some embodiments. In particular, anodized parts were sealed using nickel acetate and zinc acetate. In the exemplary trials, ultra pure water (UPW) extraction (2 hours at 50° C.) was performed on these samples. Ion chromatography was used to detect the presence of acetate anions in those anodized parts that were sealed using nickel acetate and zinc acetate. FIG. 10 illustrates that an anodized part sealed using an acetate standard, an anodized part sealed using nickel acetate, and an anodized part sealed using zinc acetate all demonstrated detectable amounts of acetate anions.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An enclosure for a portable electronic device, the enclosure comprising:
   an aluminum alloy substrate; and
   an anodized layer overlaying and formed from the aluminum alloy substrate, wherein the anodized layer defines an external surface that has a concentration of zinc that is between about 3 wt % to about 7 wt %.

2. The enclosure of claim 1, wherein the anodized layer defines a pore having a pore wall that extends between an opening at the external surface of the anodized layer and a terminus near the aluminum alloy substrate, wherein dye particles are deposited in the pore and impart the anodized layer with a predetermined color.

3. The enclosure of claim 2, wherein the dye particles are zinc-based, and contribute no more than about 1 wt % of the concentration of zinc at the external surface.

4. The enclosure of claim 1, wherein the concentration of zinc decreases as a function of a distance from the external surface such that a region of the anodized layer away from the external surface has a concentration of zinc that is less than the concentration of zinc at the external surface.

5. The enclosure of claim 4, wherein at a first distance from the external surface, the concentration of zinc is about 2 wt % or less.

6. The enclosure of claim 1, wherein the aluminum alloy substrate comprises an amount of zinc that contributes no more than about 1 wt % of the concentration of zinc at the external surface.

7. The enclosure of claim 1, wherein the anodized layer is substantially free of nickel.

8. An enclosure for a portable electronic device, the enclosure comprising:
   a metal substrate; and
   a metal oxide layer that overlays the metal substrate, the metal oxide layer comprising:
      pores that extend between openings at an external surface of the metal oxide layer and terminate at a termini near the metal substrate; and
      a zinc-based sealant that fills the pores of the metal oxide layer;
   wherein an external concentration of zinc at the external surface of the metal oxide layer is greater than an internal concentration of zinc at the termini of the pores.

9. The enclosure of claim 8, wherein the metal substrate is a zinc-based alloy, and the metal oxide layer includes zinc that is diffused from the metal substrate.

10. The enclosure of claim 9, wherein the zinc diffused from the metal substrate accounts for no more than about 1 wt % of the external concentration of zinc.

11. The enclosure of claim 8, wherein the external concentration of zinc is between about 3 wt % to about 7 wt %.

12. The enclosure of claim 8, wherein the pores include zinc-based dye particles that account for no more than about 1 wt % of the external concentration of zinc.

13. The enclosure of claim 8, wherein the metal substrate is a nickel-based alloy, and the metal oxide layer is generally free of nickel.

14. The enclosure of claim 8, wherein the zinc-based sealant has a microstructure that is sufficient to plug the openings to prevent external contaminants from entering the pores and reaching the metal substrate.

15. A method for forming an enclosure for a portable electronic device, the enclosure including a metal substrate that is overlaid by a metal oxide layer, the method comprising:
   sealing pore structures of the metal oxide layer by exposing the metal oxide layer to a zinc-based sealing solution such that a concentration of zinc at an external surface of the metal oxide layer is between about 3 wt % to about 7 wt %.

16. The method of claim 15, wherein the zinc-based sealing solution includes zinc acetate.

17. The method of claim 16, wherein the zinc acetate includes between about 1 g/L to about 10 g/L of zinc.

18. The method of claim 17, wherein the metal oxide layer is exposed to the zinc-based sealing solution in a bath having a temperature that is greater than 80° C.

19. The method of claim 15, wherein the zinc-based sealing solution is free of nickel.

20. The method of claim 15, wherein, prior to sealing the pore structures, the method further comprises:
   dyeing the metal oxide layer by exposing the metal oxide layer to a dye solution, wherein the dye solution contributes no more than 1 wt % of the concentration of zinc at the external surface of the metal oxide layer.

* * * * *